A. B. KNIGHT.
APPARATUS TO MELT EDGES OF GLASSWARE.
APPLICATION FILED SEPT. 7, 1915.

1,176,151.

Patented Mar. 21, 1916.
2 SHEETS—SHEET 1.

Inventor
A. B. Knight,

Witnesses

By C. L. Parker
Attorney

A. B. KNIGHT.
APPARATUS TO MELT EDGES OF GLASSWARE.
APPLICATION FILED SEPT. 7, 1915.

1,176,151.

Patented Mar. 21, 1916.
2 SHEETS—SHEET 2.

Witnesses

Inventor
A. B. Knight,
By C. L. Parker, Attorney

UNITED STATES PATENT OFFICE.

ALBERT BREAKENRIDGE KNIGHT, OF FAIRMONT, WEST VIRGINIA.

APPARATUS TO MELT EDGES OF GLASSWARE.

1,176,151. Specification of Letters Patent. Patented Mar. 21, 1916.

Application filed September 7, 1915. Serial No. 49,251.

*To all whom it may concern:*

Be it known that I, ALBERT B. KNIGHT, a citizen of the United States, residing at Fairmont, in the county of Marion and State of West Virginia, have invented certain new and useful Improvements in Apparatus to Melt Edges of Glassware, of which the following is a specification.

My invention relates to improvements in means for heating the ends of tumblers or other glass ware, after the same have been cracked off and ground, to melt the edges and provide smooth surfaces, while not necessarily restricted to such use.

An important object of the invention is to provide improved heating means, which will properly melt the edges of the glass ware, without discoloring them.

A further object of the invention is to provide a machine of the above mentioned character, which is expeditious and continuous in operation.

Other objects and advantages of the invention will be apparent during the course of the following description.

Figure 1:
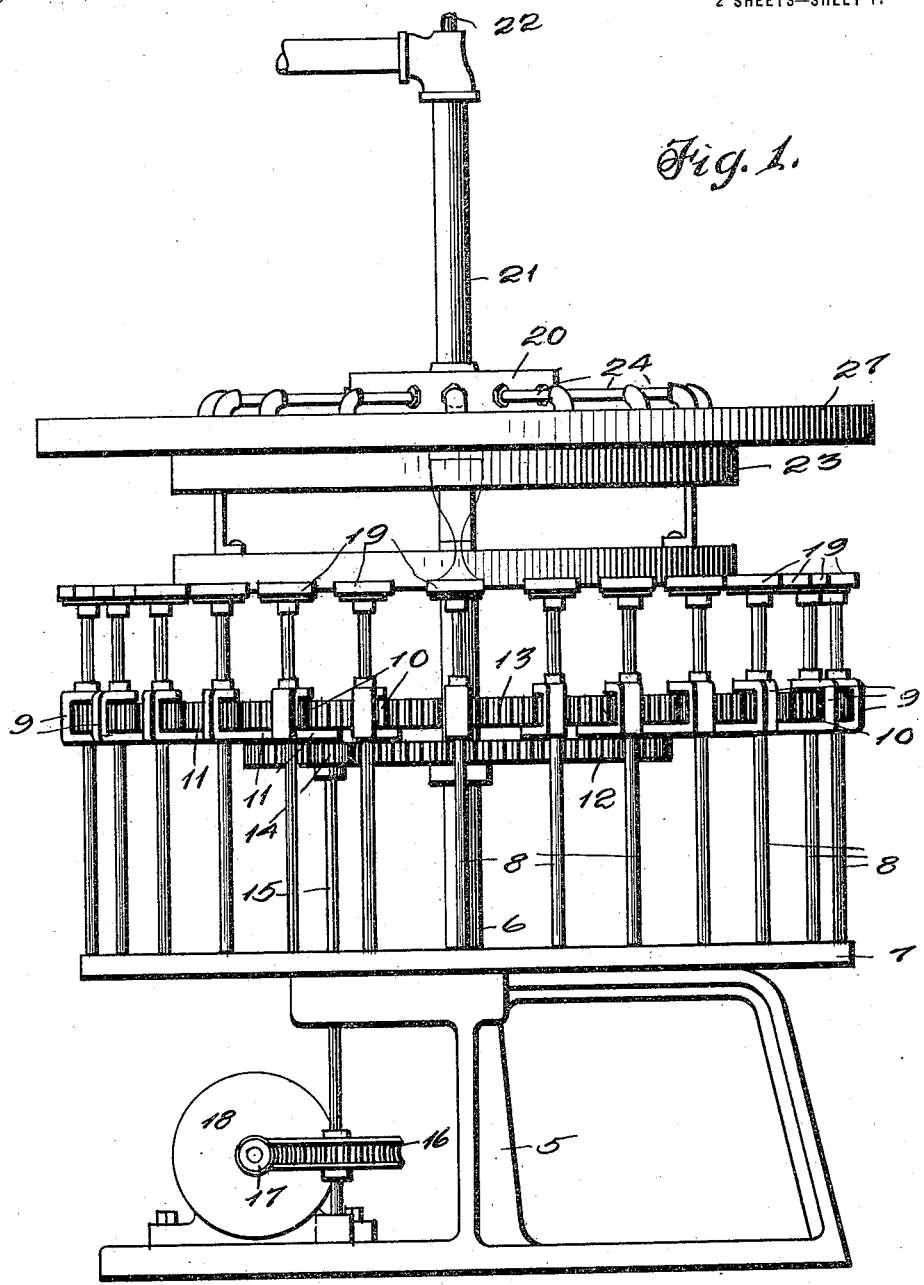
Figure 2:
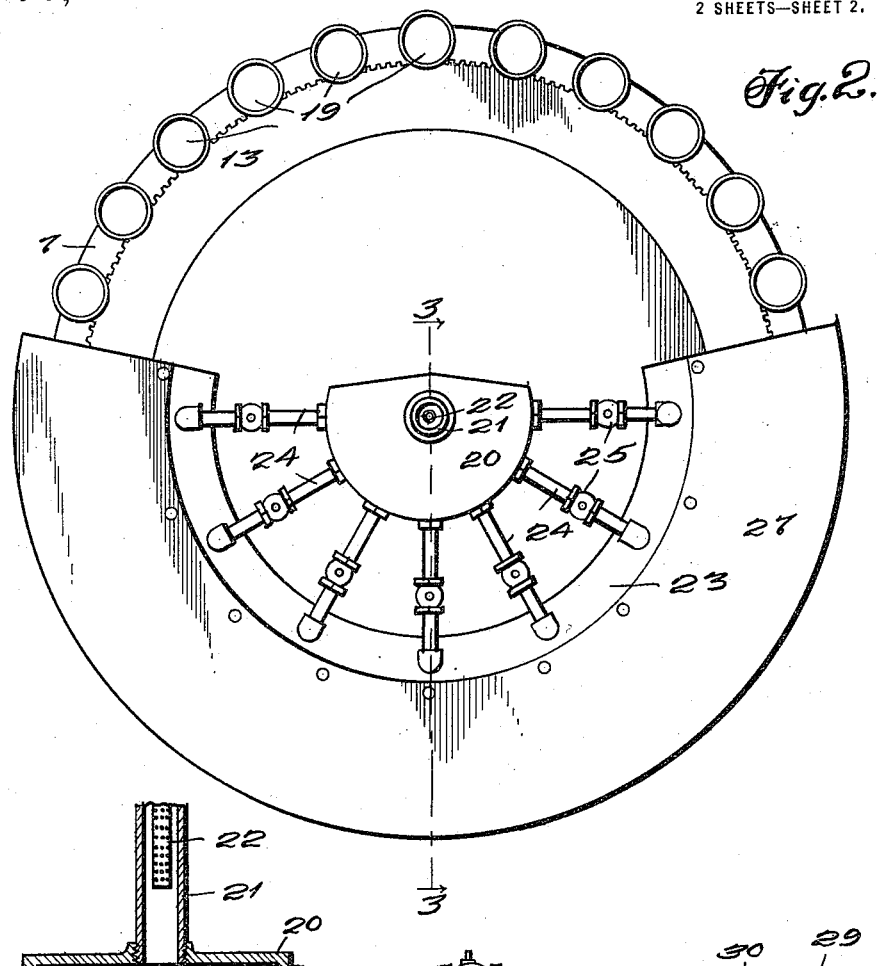
Figure 3:
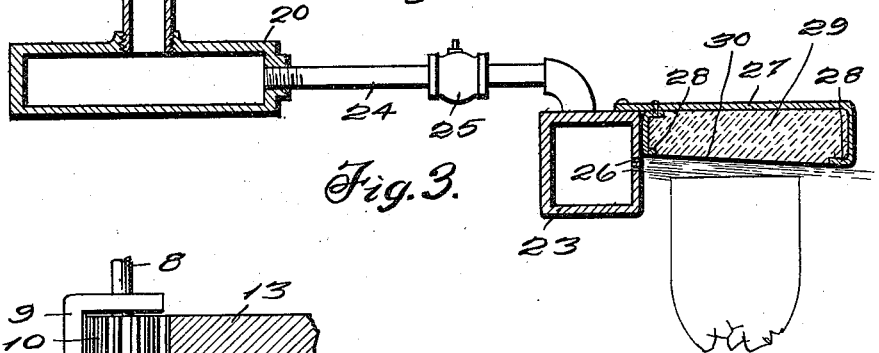
Figure 4:
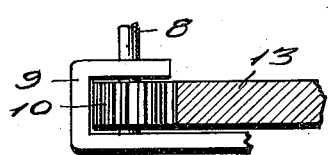

In the accompanying drawings forming a part of this specification and in which like numerals are employed to designate like parts throughout the same, Figure 1 is a side elevation of the machine embodying the invention, Fig. 2 is a plan view of the same, Fig. 3 is an enlarged vertical sectional view taken on line 3—3 of Fig. 2, and, Fig. 4 is a side elevation of a pinion and associated elements.

In the drawings, wherein for the purpose of illustration is shown a preferred embodiment of my invention, the numeral 5 designates a stationary support or base, upon which is mounted a stationary upstanding shaft 6. Disposed upon the base 5 is a stationary ring 7. Slidably mounted upon the stationary ring 7 are spindles 8, adapted to bodily move around the ring 7 in slidable contact therewith and to be turned upon their longitudinal axes. These spindles 8 are rotatably mounted through brackets 9 (Fig. 4), which straddle pinions 10, rigidly attached to the spindles. These brackets are provided at their lower ends with inwardly extending radially disposed arms 11, which are connected with a gear 12. This gear is rotatably mounted upon the stationary shaft 6.

The numeral 13 designates a stationary gear, rigidly mounted upon the shaft 6 and engaging the pinions 10, as shown.

The gear 12 receives its rotation from a pinion 14, mounted upon a rotatable vertical shaft 15. This shaft is driven by a worm wheel 16, receiving its rotation from a worm 17, connected with a motor 18 to be driven thereby. It is thus apparent that when the motor 18 is operating, the gear 14 will turn the gear 12, which will bodily rotate the spindles 8 about the stationary ring 7, these spindles also rotating upon their longitudinal axes by virtue of the pinions 10 traveling in engagement with the stationary ring 13.

Rigidly connected with the upper ends of the spindles 8 are trays 19, or the like, upon which are placed tumblers or glass ware to be heated. Suitably supported above the trays 19 and disposed preferably concentrically with relation thereto is an air and gas mixing casing or shell 20, which is approximately semi-cylindrical. Leading into the top of this casing 20 is an air inlet pipe 21, having communication with a fan (not shown) or the like for forcing air therein. Extending longitudinally within the pipe 21 is a gas supply pipe 22, the outer end of which is connected with a source of gas under suitable pressure. The lower end of this pipe is preferably closed, and its lower portion perforated, and arranged near and spaced from the mixing casing 20, as shown.

The numeral 23 designates an approximately semi-cylindrical burner-conduit, preferably formed of metal, and connected with radially disposed pipes 24, leading into the mixing casing 20. These pipes 24 are preferably provided with cut off valves 25 by means of which the passage of fuel into the burner-conduit 23 may be properly regulated. The burner or burner-conduit 23 is disposed inwardly of the trays 19 and concentrically with relation thereto and is provided upon its outer vertical side with horizontally arranged apertures or openings 26, through which the gas passes and is ignited. As the hot portion of the flame is near its outer end, this flame does not heat the iron burner 23 sufficiently to oxidize it whereby the flame will not discolor the tumblers, when contacting therewith.

Attached to the top of the burner-conduit 23 and extending horizontally outwardly therefrom is a curved deflector casing 27, preferably formed of metal and having flanges 28. This casing provides, a chamber for the reception of non-metallic heat resisting material, such as fire clay 29, or other cementitious material. The fire clay has its lower surface 30 preferably slightly inclined and extending downwardly toward its outer edge. Particular attention is called to the fact that the metallic flanges 28 do not come in contact with the hot portion of the flame which will contact with the glass ware, whereby the metal cannot be oxidized and transmitted to the glass ware to discolor it. The flame passing from the apertures 26 will pass horizontally over the top of the goblets with a tendency to rise, and the inclined surface 29 of the fire clay sufficiently overcomes this tendency whereby a substantially horizontal sheet of flame passes over and in proximity to the top of the goblets to properly melt them.

The operation of the apparatus is as follows: The shaft 6 being rotated clockwise, trays 19 are bodily rotated in the same direction, while turning upon their vertical axes. As each tray moves into the opening rearwardly of the burner-conduit 23, a goblet or other article of glass ware is placed thereon. This goblet will then be carried beneath the deflecting surface and subjected to the action of a substantially horizontal sheet of flame, while the goblet is moving longitudinally of the burner and is rotating upon its axis. The flame provided by this machine will properly melt the edge of the goblet without in any way discoloring it.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having thus described my invention, what I claim is:—

1. In apparatus of the character described, a substantially horizontal longitudinally curved burner conduit provided upon one curved side with approximately horizontal apertures for the passage of fuel, means for supplying fuel to the burner conduit, a deflector member formed of non-metallic material and arranged upon and adjacent the curved apertured side of the burner conduit with its lower deflecting face disposed above and adjacent the apertures thereof, means for holding the deflector member in place, a plurality of devices arranged beneath the deflector member outwardly of and near the burner conduit and adapted to hold articles of glass ware to be heated, and means for bodily rotating the devices with respect to the deflector member and rotating them upon their axes.

2. In apparatus of the character described, a substantially horizontal longitudinally curved burner conduit provided upon one curved side with approximately horizontal apertures for the passage of fuel, means for supplying fuel to the burner conduit, a deflector member formed of non-metallic material and arranged upon and adjacent the curved apertured side of the burner conduit with its lower deflecting face disposed above and adjacent such apertures, said lower deflecting face being vertically inclined and extending downwardly toward its outer edge and having its inner edge disposed approximately in alinement with the tops of the apertures, a plurality of devices arranged beneath the deflector member outwardly of and near the burner conduit and adapted to hold articles of glass ware to be heated, and means to bodily rotate the devices with respect to the deflector member and rotate them upon their longitudinal axes.

3. In apparatus of the character described, a substantially horizontal longitudinally curved burner conduit provided upon one curved side with approximately horizontal apertures for the passage of fuel, means for supplying the fuel to the burner conduit, a casing attached to the burner conduit and disposed upon the curved apertured side thereof and having its bottom side open, a filling of plastic material for the casing having its lower deflecting surface disposed above and adjacent the apertures of the burner conduit and inclined downwardly toward its outer edge, a plurality of devices arranged beneath the deflector member outwardly of and near the burner conduit and adapted to hold articles of glass ware to be heated, and means to bodily rotate the devices with respect to the burner conduit and turning them upon their axes.

In testimony whereof I affix my signature in presence of two witnesses.

ALBERT BREAKENRIDGE KNIGHT.

Witnesses:
H. T. SHARP,
W. S. BLACK.